F. HEDLEY & J. S. DOYLE.
ELECTRIC HEATING SYSTEM FOR CARS.
APPLICATION FILED DEC. 4, 1911.
1,054,766.
Patented Mar. 4, 1913.
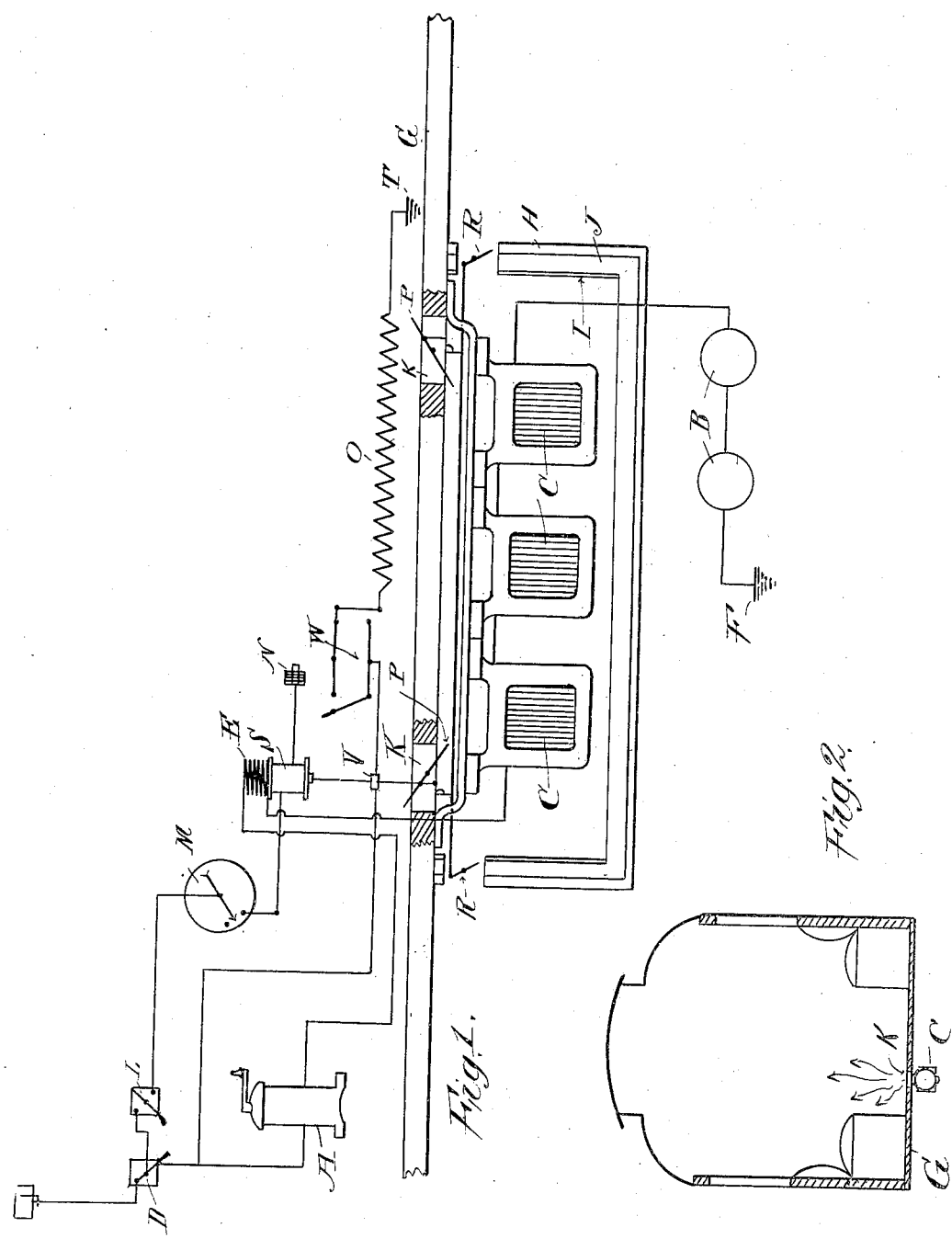

UNITED STATES PATENT OFFICE.

FRANK HEDLEY, OF YONKERS, AND JAMES S. DOYLE, OF MOUNT VERNON, NEW YORK.

ELECTRIC-HEATING SYSTEM FOR CARS.

1,054,766.  Specification of Letters Patent.  Patented Mar. 4, 1913.

Application filed December 4, 1911. Serial No. 663,791.

*To all whom it may concern:*

Be it known that we, FRANK HEDLEY and JAMES S. DOYLE, both citizens of the United States, and residents, respectively, of Yonkers and Mount Vernon, county of Westchester, and State of New York, have made a certain new and useful Invention in Electric-Heating Systems for Cars, of which the following is a specification.

This invention relates to heating systems for electric cars, and particularly to such systems where current is supplied to the electric propelling motors.

The object of the invention is to utilize the starting resistance for the propelling motors for supplying the heat for the interior of the cars.

A further object of the invention is to provide a system of electric car heating in which the heater load on the power plant is eliminated.

Other objects of the invention will appear more fully hereinafter.

The invention consists substantially in the construction, combination, location and arrangement of parts, all as will be more fully hereinafter set forth, as shown in the accompanying drawing, and finally pointed out in the appended claims.

Referring to the accompanying drawing,—Figure 1, is a view in diagram showing an arrangement of electric heating system embodying the principles of our invention and wherein the motor starting resistance is employed to furnish heat for heating the car. Fig. 2, is a view in transverse section of a car showing the application thereto of a heating system embodying the principles of our invention.

In the operation of power plants for supplying current for the operation of electric railway systems, it is necessary to design and plan the plant with reference to the peak load thereof, that is to say, the peak load imposed on the plant is the maximum requirement for operating the street car system supplied therefrom under maximum conditions of current supply for propelling motors for heaters and for the operation of other auxiliary devices simultaneously when operating under their maximum capacity. In other words the power plant must be designed and equipped with reference to furnishing the maximum supply of current that may be required for the operation of the street car system and the peak load as thus established becomes the standard or basis of measure in the designing and equipment of the plant, therefore to whatever extent the peak load may be decreased to a proportionately similar extent and degree is the designing and equipping the power plant correspondingly decreased. Experience has demonstrated that the current consumption required for operating the ordinary forms of electric heaters for the street car system forms a material and large percentage of the total current output of the power plant. This percentage of output of the plant of course is added to the percentage of current output for operating the propelling motors and such auxiliary devices as may require current consumption in making the peak load on the power plant upon the basis of which the power plant is initially designed and equipped.

It is among the special purposes of our present invention to eliminate the percentage of current consumption heretofore required for the heating devices of the system from the peak load on the power plant.

In accordance with our invention we propose to utilize for car heating purposes the starting resistances for the propelling motors. In starting up the propelling motors it is universally customary to interpose resistances or rheostats in circuit with the motors so as to protect the motors in starting up and until they develop sufficient counter electro-motive force to take care of themselves, the starting resistances being gradually cut out of circuit as the motors attain their normal operating speeds or running conditions. The current thus supplied to the motors through the starting resistances is consumed in developing heat in the resistance coils but this current consumption is ordinarily considered as a necessary incident to the operation of the motors although as a matter of fact the current consumed in the heating of the resistance coils is practically waste current and in addition to the current supplied from the power plant for this purpose the power plant is called on to supply additional current for car heating purposes.

We have found that under proper conditions of control and arrangement the starting resistances for the motors may be employed to furnish sufficient heat for heating the cars without the necessity for drawing on the power plant for the supply of additional current for that purpose. In carrying out our invention we propose to arrange the motor starting resistance coils in such relation to the car as to furnish the heat developed therein to the interior of the car for car heating purposes. We have found in practice, particularly where the motors are required to be repeatedly and frequently started and stopped that the heating coils, when heated up by the initial starting up of the motors retain their heat during the brief intervals during which the motors are cut out of working circuit, and that when again started up, the coils, being already in heated condition, are more readily heated again with the second starting of the motors, and that this condition continues throughout the intermittent and frequent starting of the car or train in service.

In the utilization of our invention we employ an automatic control for the heat supply from the rheostats or starting resistance coils so as to secure an even temperature in the car.

Referring to the accompanying drawing A, is the usual controller through the operation of which the current is supplied to the propelling motors B, B, through resistance coils or rheostats C, C, in the ordinary manner. If desired, the usual bus-bar or other main-switch D, may be placed in the main supply circuit to the controller A. The circuit from the supply source, assuming switch D, to be closed, is through the controller A, a solenoid coil E, the starting resistance coils C, and motors B, to ground at F. In practice we propose to locate the starting resistance coils C, beneath the floor G, of the car, and to inclose them within an air tight box or chamber composed of the exterior shell H, which, if desired, may be of wood, and an interior lining I, which, if desired, may be of asbestos lumber with a dead air space J, between them. This inclosing box or casing is suitably supported beneath the car floor and in such relation to openings K, through the floor G, of the car, as to permit the heat developed in the resistance coils to enter the interior of the car. We have found in practice that a convenient and effective location of the rheostat inclosing casing is beneath the floor of the car about the mid-length point of the car and near the transverse center of the car. Our invention however, is not to be limited or restricted with respect to any particular location of the starting resistances and their inclosing box or casing as our invention contemplates the location of the same at any suitable or convenient point where the objects and purposes in view may be accomplished.

We have stated that the circuit of the motors and starting resistances includes a solenoid coil E. Upon the same solenoid is another coil S, which is arranged in a circuit around the motor controller and which is controlled by a switch L, and an automatic thermostatically controlled switch M, to ground at N. The solenoid coils E, S, control suitable dampers P, R, in any suitable manner, the dampers P, controlling the openings K, through the floor of the car to the interior, and the dampers R, controlling openings through the ends of the starting resistance casing or box to the outer air. The arrangement is such that when the dampers P, are opened, the dampers R, are closed, and when the dampers R are opened, the dampers P are closed.

The operation of the automatic damper control mechanism is as follows:—When it is desired to start a car the switches D and L, are first closed. The closing of switch L, completes circuit through the thermostat M, and coil S, to ground at N, assuming the thermostat switch device M, to be in initial circuit closing condition. The resulting energization of coil S, operates the solenoid to cause the same to open the dampers P, and to close the dampers R, thereupon the motor controller A, is operated to supply current through the coil E, and resistance coils C, and motors D. Of course, it is obvious that the motor controller A, may be first operated. The coils E, S, are so related and arranged as to operate against each other so that when a sufficient degree of heat has been furnished to the interior of the car to cause the thermostat M, to operate, it being obvious that this thermostat may be adjusted to operate at any desired temperature, the circuit through coil S, will be broken, thereupon gravity becomes effective to operate the solenoid in a direction to close dampers P, and to open dampers R, thereby shutting off the heat delivered into the car and permitting it to escape from the box or casing which incloses the rheostats to the outer air. When the temperature within the car falls sufficiently to cause the thermostat M, to again complete the circuit through solenoid coil S, the dampers P, are again opened and dampers R closed to permit of additional heat supply to the interior of the car from the rheostats. Thus it will be seen that an automatic heat regulation is accomplished and maintained. If desired heater coils O, of the ordinary type may be arranged within the car and supplied by current through a circuit around the controller A, and through a switch device W, to ground at T. Arranged in this circuit is an automatic switch or bridging contact V, controlled by the solenoid coil E, so that whenever the dampers P, are opened the bridging switch V, is closed, thereby supplying current to the car heaters O, provided switch device W, is also closed, and whenever dampers P, are closed the bridging switch V, is opened.

From the foregoing description it will be seen that we provide an exceedingly simple and efficient arrangement of car heating system wherein the starting resistance is employed for heating the car, and we have found in practice that with an arrangement and an automatic control such as above described with the heat delivered into the car from the inclosing box or casing of the resistance coils is ordinarily sufficient for adequately heating the car, thereby enabling us to operate the propelling motors and also to heat the cars with the same amount of current that has heretofore been employed to operate the motors. In the ordinary operation, of course, the starting resistances are cut out in the usual manner by the operation of the controller A.

We have found in practice, that an electric heating system for cars embodying the principles of our invention, such as above described, and wherein the starting resistance coils are inclosed, so that the heat therefrom can be used for heating the cars, or may be discharged outside of the car at times when the heat is not needed in the car, affords ample provision for maintaining the desired degree of temperature within the car under ordinary operating conditions. In the operation of street car systems, wherein the motor starting resistances are employed for heating the cars we have found in practice that it is desirable to also employ an auxiliary heating coil or coils, the circuit of which can be completed when desired, independently of the motor circuit so as to raise the temperature to a desirable degree in the car while the car is standing in the car-barns, on side tracks or the like, but in such case, the current required for heating purposes is not imposed on the supply source while the motors are in operation. Moreover, as above described, we have found it desirable to automatically control the independent heating circuit thermostatically so as to shut off the independent heating coil when a desired degree of temperature in the car is attained and, in accordance with our invention, we also employ automatic means, controlled by the current through the motor circuit for automatically opening the auxiliary heating circuit when the current supplied to the motors falls to an average motor running value. This is the function of coil E. We also provide means for automatically operating the dampers through which the heat from the rheostat inclosing casing may be admitted to the interior of the car, or delivered to the atmosphere outside the car, according as requirements may demand.

Having now set forth the objects and nature of our invention and a construction embodying the principles thereof, what we claim as new and useful and of our own invention, and desire to secure by Letters Patent is,—

1. In an electric heating system for railway or other cars, the combination with electric propelling motors having starting resistance coils, an inclosing casing for the resistance coils, said casing located beneath the floor of the car, said floor having openings to communicate with the interior of the casing to permit the heat from the resistance coil inclosing casing to pass into the interior of the car.

2. In an electric heating system for railway or other cars, the combination with electric propelling motors for the cars, of resistance coils arranged in the motor circuit, an inclosing casing for said resistance coils, said casing located beneath the floor of the car and communicating through openings in the floor with the interior of the car, and means for controlling the supply of heat from said inclosing casing to the interior of the car.

3. In an electric heating system for railway or other cars, the combination with electric car propelling motors of starting rheostats therefor, an inclosing casing for said rheostats, said casing located beneath the floor of the car and communicating through openings in the floor with the interior of the car, and means for automatically controlling the supply of heat from said inclosing casing to the interior of the car.

4. In an electric heating system for cars, the combination with electric car propelling motors, of starting resistance rheostats therefor, an inclosing casing for said rheostats, said casing located beneath the floor of the car and communicating through openings in the floor with the interior of the car, and means controlled by the current in the motor circuit for controlling the supply of heat from said casing to the interior of the car.

5. In an electric heating system for railway or other cars, the combination with electric car propelling motors, of starting resistance coils therefor, an inclosing casing for said coils, said casing located beneath the floor of the car and communicating through openings in the floor with the interior of the car, dampers for controlling the communication between said inclosing casing and the interior of the car, and means for controlling said dampers.

6. In an electric heating system for railway or other cars, the combination with electric car propelling motors, of starting resistance coils therefor, an inclosing casing for said coils, said casing communicating with the interior of the car and also with the outer air, and means for controlling said communications, said means so operating that when the communications to the interior of the car are opened those to the outer air are closed, or opened.

7. In an electric heating system for railway or other cars, the combination with electric car propelling motors, of starting resistance coils therefor, an inclosing casing for said coils having openings to the interior of the car and to the outer air, dampers for controlling said openings, and automatically controlled means for actuating said dampers.

8. In an electric heating system for railway or other cars, the combination with electric car propelling motors of starting resistance coils therefor, an inclosing casing for said coils, said casing having openings to the interior of the car and to the outer air, dampers for said openings and thermostatic means for automatically controlling said dampers.

9. In an electric heating system for railway or other cars, the combination with the electric car propelling motors, starting resistance coils therefor, and an inclosing casing for said coils, said casing communicating with the interior of the car, of an auxiliary heating device for the car, an independent circuit therefor, and means for controlling said circuit.

10. In an electric heating system for railway or other cars, a car propelling motor, a starting resistance therefor, an inclosing casing for said resistance, said casing communicating with the interior of the car to supply the heat developed therein to the interior of the car, an auxiliary heating device for the car, an independent circuit therefor and means for automatically controlling the independent circuit.

11. In an electric heating system for railway or other cars, an electric car propelling motor, a starting resistance coil therefor, an inclosing casing for said resistance, said casing communicating with the interior of the car to supply the heat developed therein to the interior of the car, an auxiliary heating device for the car, an independent circuit therefor, means for controlling the supply of heat from the starting resistance to the interior of the car, said means also controlling the independent car heater circuit.

12. In an electric heating system for railway or other cars, electric car propelling motor, a starting resistance therefor, an inclosing casing for said resistance, said casing communicating with the interior of the car to supply the heat developed therein to the interior of the car, an auxiliary heating device, a relay for controlling the supply of heat from the resistance coils to the interior of the car, said relay being arranged in the motor circuit to be actuated by current therein to control the auxiliary heating device.

13. In an electric heating system for railway or other cars, an electric car propelling motor, a starting resistance coil therefor, an inclosing casing for said resistance, said casing communicating with the interior of the car to supply the heat developed therein to the interior of the car, a switch controlling the circuit of the starting resistance, and a relay arranged in the motor circuit for operating said switch.

14. In an electric heating system for railway or other cars, an electric propelling motor, a starting resistance therefor, an inclosing casing for said resistance, said casing communicating with the interior of the car to supply the heat developed therein to the interior of the car, an auxiliary heater device for the car, a circuit therefor, a switch in the auxiliary heater circuit, and means arranged in the motor circuit for controlling said switch.

15. In an electric heating system for railway or other cars, a propelling motor, an inclosing casing located beneath the car floor, a starting resistance coil for the motor arranged within said casing, said casing communicating with the interior of the car, electrical devices for controlling said communications, and a thermostatic device for controlling the circuit of said electrical devices.

In testimony whereof we have hereunto set our hands in the presence of the subscribing witnesses, on this 27th day of November A. D., 1911.

FRANK HEDLEY.
JAMES S. DOYLE.

Witnesses:
 CHARLES V. SMITH,
 S. E. DARBY.